(12) United States Patent
Keaton et al.

(10) Patent No.: US 7,661,377 B2
(45) Date of Patent: Feb. 16, 2010

(54) SEED METER WITH FLEXIBLE SEED DISC

(75) Inventors: Miles R. Keaton, Port Byron, IL (US);
Michael E. Friestad, Rock Island, IL (US); Nathan A. Mariman, Mahomet, IL (US); David J. Rylander, Victoria, IL (US)

(73) Assignee: Deere & Company, Moline, IL (US)

( * ) Notice: Subject to any disclaimer, the term of this patent is extended or adjusted under 35 U.S.C. 154(b) by 93 days.

(21) Appl. No.: 11/781,483

(22) Filed: Jul. 23, 2007

(65) Prior Publication Data
US 2009/0025620 A1    Jan. 29, 2009

(51) Int. Cl.
A01C 7/00    (2006.01)
A01C 9/00    (2006.01)

(52) U.S. Cl. ..................................... 111/185
(58) Field of Classification Search ......... 111/183–185, 111/77, 78; 221/211, 265, 264, 277
See application file for complete search history.

(56) References Cited

U.S. PATENT DOCUMENTS 4,047,638 A    9/1977    Harrer et al.
5,799,598 A *  9/1998    Stufflebeam et al. ........ 111/185
6,176,393 B1   1/2001    Luxon ........................ 221/211

FOREIGN PATENT DOCUMENTS

EP    0152048 A1    8/1985
EP    0536768 A1    4/1993

OTHER PUBLICATIONS

European Search Report Application No. 08159310.5-1260 Nov. 7, 2008.

* cited by examiner

*Primary Examiner*—Christopher J. Novosad
(74) *Attorney, Agent, or Firm*—Taylor & Aust, P.C.

(57) ABSTRACT

A seed meter for use in an agricultural seeding machine includes a housing having an inner chamber and one or more deflectors within the inner chamber, and a seed disc rotatably carried by the housing. The seed disc includes at least a portion thereof formed from a flexible material which is deflectable by the one or more deflectors during rotation within the housing.

10 Claims, 4 Drawing Sheets

SEED METER WITH FLEXIBLE SEED DISC

FIELD OF THE INVENTION

The present invention relates to agricultural seeding machines and more particularly to seed meters used to meter seeds for placement in a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is movably coupled with a tool bar. The frame may carry a main seed hopper, herbicide hopper and insecticide hopper. If a herbicide and insecticide are used, the metering mechanisms associated with dispensing the granular product into the seed trench are relatively simple. On the other hand, the mechanisms necessary to properly meter the seeds, and dispense the seeds at predetermined relative locations within the seed trench are relatively complicated.

The mechanisms associated with metering and placing the seeds generally can be divided into a seed metering system and a seed placement system which are in series communication with each other. The seed metering system receives the seeds in a bulk manner from the seed hopper carried by the frame. Different types of seed metering systems may be used, such as seed plates, finger plates and seed disks. In the case of a seed disk metering system a seed disk is formed with a plurality of seed cells spaced about the periphery of the disk. Seeds are moved into the seed cells with one or more seeds in each seed cell depending upon the size and configuration of the seed cell. A vacuum or positive pressure air differential may be used in conjunction with the seed disk to assist in movement of the seeds into the seed cell. The seeds are singulated and discharged at a predetermined rate to the seed placement system.

The seed placement system may be categorized as a gravity drop system or a power drop system. In the case of the gravity drop system, a seed tube has an inlet end which is positioned below the seed metering system. The singulated seeds from the seed metering system merely drop into the seed tube and fall via gravitational force from a discharge end thereof into the seed trench. The seed tube may have a rearward curvature which reduces bouncing of the seed as it strikes the bottom of the seed trench.

Seed metering systems as described above are generally effective for seed singulation and seed spacing control. However, certain operating conditions such as side hills, etc. adversely affect the seed singulation and seed spacing. The seed pool area within the seed meter is at the bottom of the meter, and the rotating seed disc lies along side the seed pool. When the seeds shift laterally away from the seed disc during a side hill condition, seed singulation and/or seed skip problems can occur resulting in undesirable seed spacing in the seed trench formed in the soil.

What is needed in the art is a seeding machine with a seed metering system that provides good seed singulation and seed spacing during a wide range of operating conditions.

SUMMARY OF THE INVENTION

The invention in one form is directed to a seed meter for use in an agricultural seeding machine, including a housing having an inner chamber and one or more deflectors within the inner chamber, and a seed disc rotatably carried by the housing. The seed disc includes at least a portion thereof formed from a flexible material which is deflectable by the one or more deflectors during rotation within the housing.

The invention in another form is directed to a seed disc for use within a seed meter of an agricultural seeding machine. The seed disc includes a substantially rigid hub and a disc extending radially from the hub. The disc includes at least a portion thereof formed from a flexible material which is laterally deflectable during rotation within the seed meter.

DETAILED DESCRIPTION OF THE INVENTION

Figure 1:
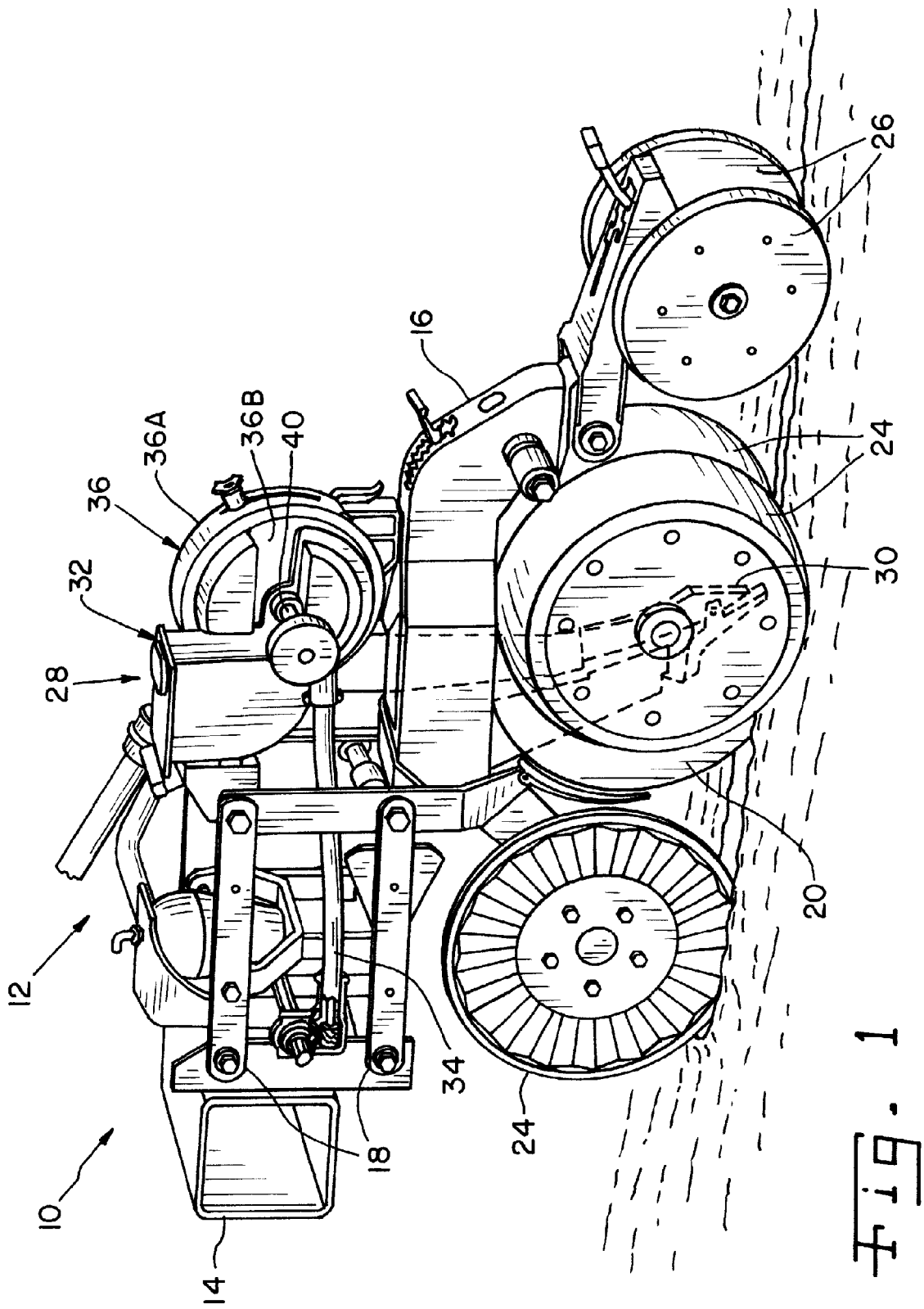
FIG. 1 is a perspective view of a row crop unit in an embodiment of an agricultural seeding machine of the present invention.
Figure 2:
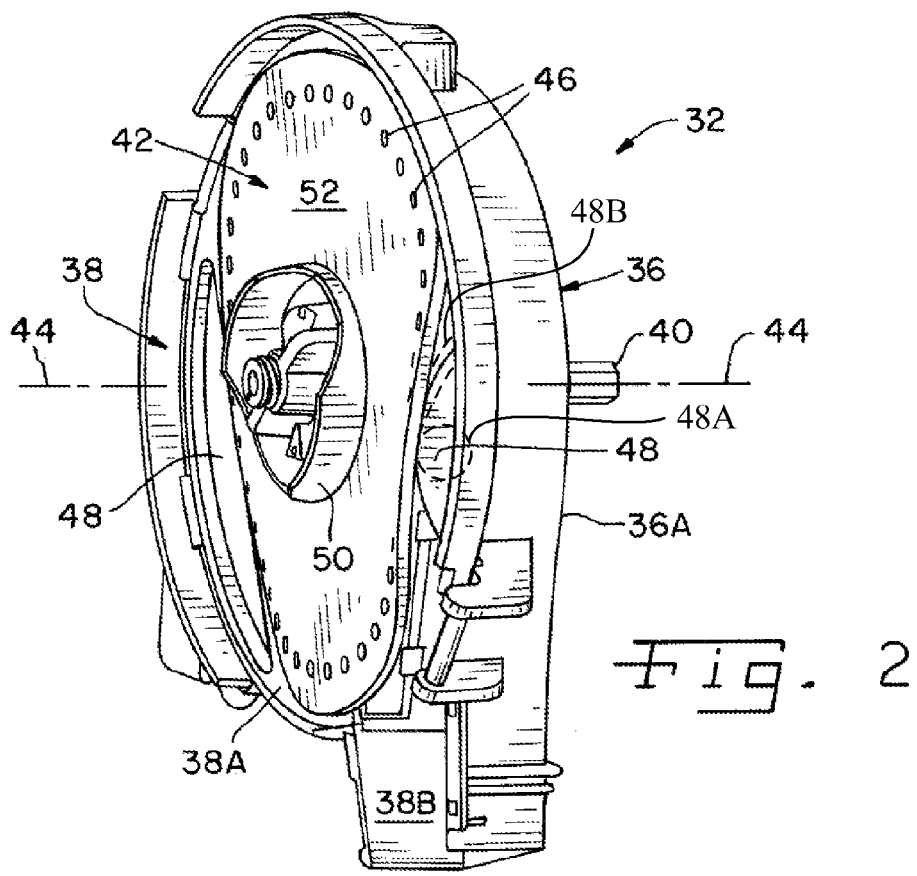
FIG. 2 is a perspective view of the seed meter on the row crop unit of FIG. 1, with part of the housing removed, and illustrating flexing of the seed disc.
Figure 3:
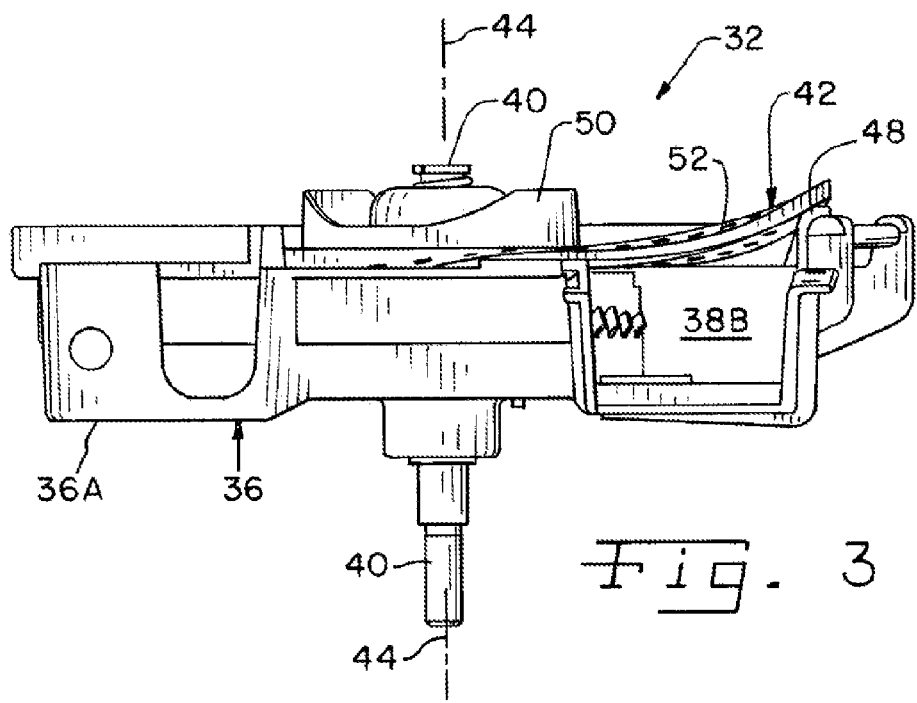
FIG. 3 is a bottom view of the seed meter of FIG. 2, with part of the housing removed, and illustrating flexing of the seed disc.
Figure 4:
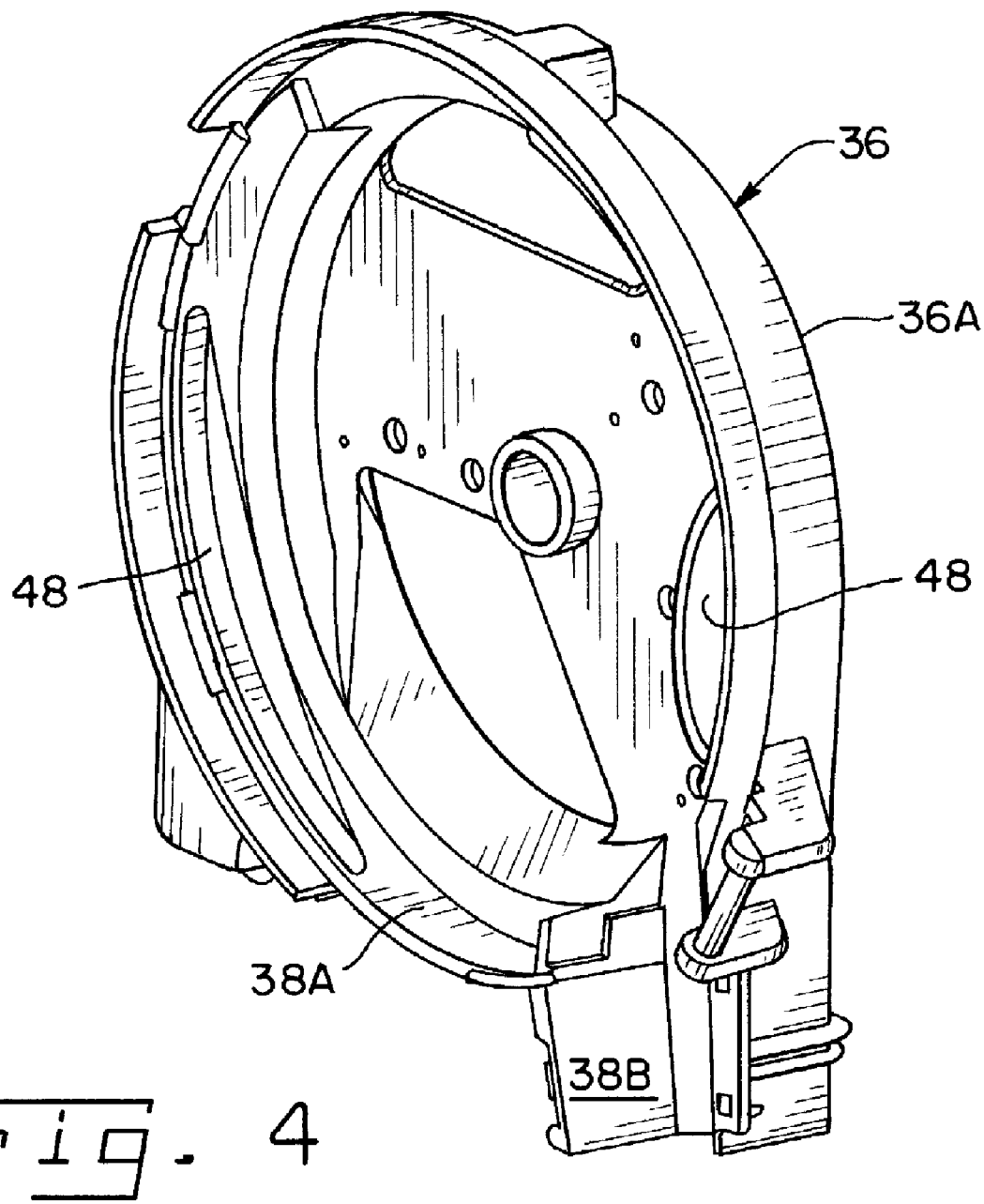
FIG. 4 is a perspective view of the seed meter shown in FIGS. 1-3, with the seed disc removed to expose the deflectors.
Figure 5:
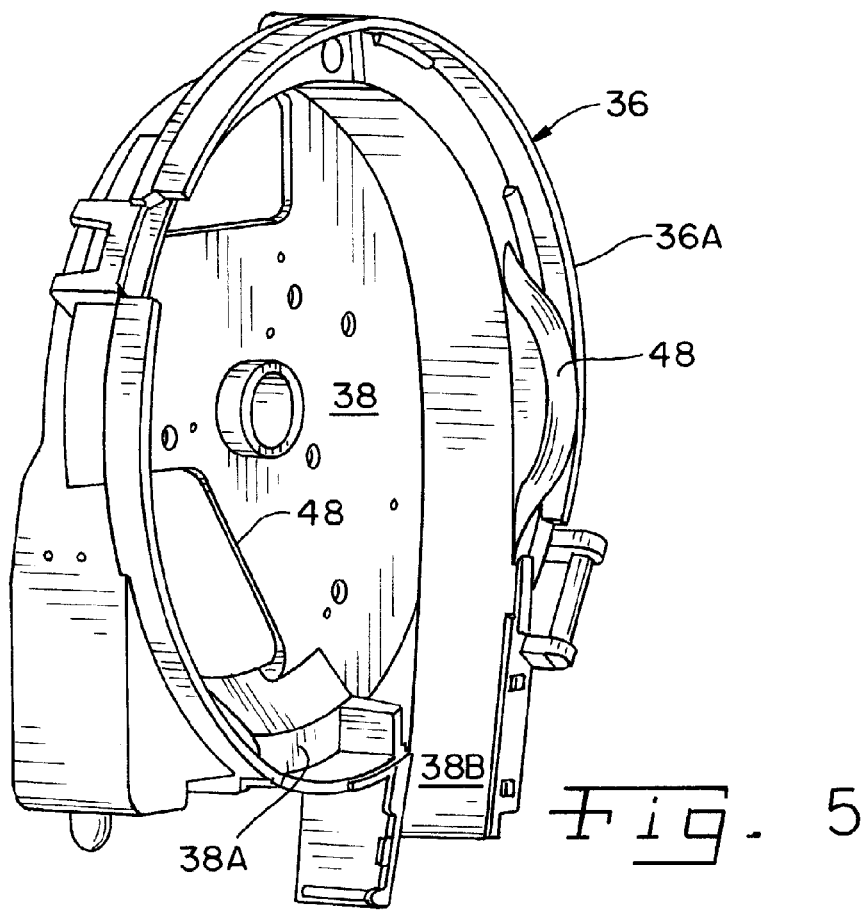
FIG. 5 is another perspective view of the seed meter shown in FIGS. 1-4, with the seed disc removed to expose the deflectors.

Referring now to the drawings, and more particularly to FIG. 1, there is shown a portion of an embodiment of an agricultural seeding machine 10 of the present invention. In the embodiment shown, seeding machine 10 is in the form of a row crop planter but may also be in the form of a grain drill, etc. FIG. 1 illustrates a single row crop unit 12 of a multi-row planter, with each row crop unit 12 being substantially identical and connected to a common tool bar 14. Only a single row crop unit 12 is shown and described below for simplicity sake.

Row crop unit 12 includes a multi-part frame 16 which is attached to tool bar 14 by parallel linkage 18. Tool bar 14 is coupled to a traction unit (not shown), such as an agricultural tractor. For example, tool bar 14 may be coupled to an agricultural tractor using a draw bar or 3-point hitch assembly. Tool bar 14 may be coupled with transport wheel assemblies, marker arms, etc. which may be of conventional design and not shown for simplicity sake.

Frame 16 carries a double disc furrow opener 20 for forming a seed trench in soil. An optional coulter wheel 22, particularly for use in no till situations, may be placed ahead of double disc furrow opener 20. A pair of gauge wheels 24 are respectively associated with the pair of discs of double disc furrow opener 20. More particularly, each gauge wheel 24 is positioned generally in line with and immediately adjacent to the outside of each respective disc of double disc furrow opener 20. Each gauge wheel 24 may be vertically adjusted to adjust the depth of the trench which is cut into the soil using double disc furrow opener 20.

A pair of closing wheels 26 are also carried by frame 16. Closing wheels 26 are positioned generally in line with double disc furrow opener 20. Closing wheels 26 are preferably biased in a downward direction and have a peripheral edge with a shape which may vary, depending upon the application.

A seed metering system 28 and a seed placement system 30 are also carried by frame 16. Seed placement system 28 is in the form of a gravity drop seed tube, but could be configured differently, such as a power drop seed placement system with a powered wheel, etc.

Seed metering system 28 receives seed from a main seed supply, such as seed from a distant main seed hopper which is supplied via air or the like, or a seed hopper carried above frame 16. Seed metering system 28 generally includes a seed meter 32 driven by a rotatable cable drive 34. Cable drive 34 includes a flexible drive cable driven by a common drive shaft at the rear of toolbar 14. Such a cable drive is marketed as a "Pro-Shaft" drive on the Pro-Series XP planter which is manufactured and sold by the assignee of the present invention. It will be understood, however, that other types of mechanical, electrical and/or hydraulic drives for seed meter 32 can be utilized.

Seed meter 30 (FIGS. 2-6) includes a multi-part housing 36, with a first housing part 36A and a second housing part 36B defining an inner chamber 38 therein. Within inner chamber 38 is a seed pool area 38A and an outlet 38B. Housing 36 rotatably carries a drive shaft 40, which in turn is concentrically coupled with and drives a seed disc 42. Drive shaft 40 has an axis of rotation 44 which also defines an axis of rotation of seed disc 42. Seed disc 42 has a plurality of seed cells 46 intermittently spaced about the periphery thereof. A vacuum source (not shown) applies vacuum pressure to seed cells 46 formed in seed disc 42. This vacuum pressure promotes entry of the seeds into seed cells 46 and maintains the seeds in place within seed cells 46. Seeds are transported from seed cells 46 to seed placement system 28. Of course, seed meter 32 may be configured with a positive pressure to assist in seed movement rather than a vacuum pressure.

According to an aspect of the present invention, seed disc 42 includes at least a portion thereof formed from a flexible material which is deflectable by one or more deflectors 48 during rotation within housing 36. More particularly, seed disc 42 includes a rigid hub 50 and a flexible disc 52 extending radially from hub 50. Hub 50 is formed from a rigid material, such as steel or a rigid plastic. In the embodiment shown, flexible disc 52 is flexible the entire radial extent from hub 50 to the outer periphery. However, flexible disc 52 can also be partially flexible in one or more isolated portions, such as radial rings or angular sections, etc. Flexible disc 52 can be formed from any type of flexible material providing a desired degree of flexure, such as urethane, thin stainless steel, rubber and/or plastic.

Deflectors 48 may have any suitable shape which functions to deflect flexible disc 52 of seed disc 42 at desired locations within inner chamber 36. For example, each deflector 48 may be in the form of a ramped surface (as shown), one or more rollers shown in dashed lines as 48A, and/or one or more fingers, shown in dashed lines as 48B, etc. Deflectors 48 are integral with housing 36, or may be separate from and attached to housing 36. In the embodiment shown, two deflectors 48 are provided within housing 36, one being positioned in association with seed pool area 38A and the other deflector being positioned in association with outlet 38B.

Figure 6:
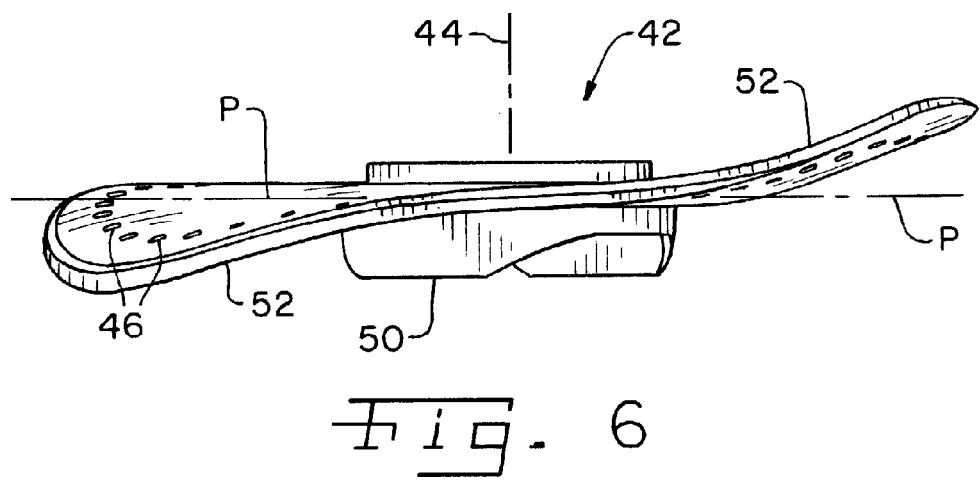
FIG. 6 is side view of the seed disc in a flexed state.

During use, a selected seed type is received from a main seed supply at seed meter 32. The seed is maintained against a side of seed disc 42, and received within seed cells 46. To assist seed movement into seed cells 46, a vacuum pressure is applied to the opposite side of seed disc 42 using a suitable vacuum source. Of course, a positive pressure may also be applied to the side of seed disc 42 at which the seeds are disposed. Each seed disc 42 of each seed meter 32 is driven using a corresponding cable drive 34 from a common drive shaft carried behind tool bar 14. As seed disc 42 rotates, it is laterally deflected in the regions of seed pool area 38A and outlet 38B by corresponding deflectors 48. Seed disc 42 generally lies within a plane of revolution P when in a non-deflected state, and is deflected laterally from the plane P by deflectors 48 during rotation within housing 36 (FIG. 6). The extent to which seed disc 42 is deflected can vary dependent upon the particular seed meter configuration. In the seed pool area 38A, seed disc 42 should "scoop" the seeds to ensure all seed cells 46 receive a seed; whereas in the region of outlet 38B, seed disc 42 should be tipped over to an extent providing effective seed release. In the embodiment shown, seed disc 42 is deflected between approximately 2 to 45 degrees in each of seed pool area 38A and outlet 38B, more preferably approximately 5 to 20 degrees. The seeds are discharged from seed meter 32 to seed placement system 30 at a predetermined rate. Closing wheels 26 close the seed trench and thereby cover the seed in the trench.

Having described the preferred embodiment, it will become apparent that various modifications can be made without departing from the scope of the invention as defined in the accompanying claims.

The invention claimed is:

1. A seed meter for use in an agricultural seeding machine, comprising:
a housing having an inner chamber and at least one deflector fixed within said inner chamber; and
a seed disc rotatably carried by said housing, said seed disc including at least a portion thereof comprised of a flexible material which is deflectable by said at least one deflector during rotation within said housing, wherein said seed disc generally lies within a plane of revolution when in a non-deflected state, and is deflected laterally from said plane by said at least one deflector during rotation within said housing.

2. The seed meter of claim 1, wherein each said at least one deflector comprises one of a ramped surface, a roller and a finger.

3. The seed meter of claim 1, wherein said seed disc includes a rigid hub and a flexible disc extending radially from said hub.

4. The seed meter of claim 3, wherein said flexible disc is one of entirely flexible and partially flexible in at least one radially isolated portion.

5. The seed meter of claim 3, wherein said hub is comprised of one of steel and a rigid plastic.

6. The seed meter of claim 1, wherein said flexible material is one of a urethane, thin stainless steel, rubber and plastic.

7. The seed meter of claim 1, wherein seed disc is deflected between approximately 2 to 45 degrees by said at least one deflector during rotation within said housing.

8. The seed meter of claim 7, wherein seed disc is deflected between approximately 5 to 20 degrees by said at least one deflector during rotation within said housing.

9. The seed meter of claim 1, wherein said housing includes a seed pool area within said inner chamber and an outlet, and each said at least one deflector is positioned in association with one of said seed pool area and said outlet.

10. The seed meter of claim 9, wherein said at least one deflector comprises two deflectors, one of said deflectors being associated with said seed pool area and an other of said deflectors being associated with said outlet.

* * * * *